(12) United States Patent
Bantum

(10) Patent No.: US 10,995,307 B2
(45) Date of Patent: May 4, 2021

(54) SOAP MELTING ASSEMBLY

(71) Applicant: George Bantum, Douglasville, GA (US)

(72) Inventor: George Bantum, Douglasville, GA (US)

( * ) Notice: Subject to any disclaimer, the term of this patent is extended or adjusted under 35 U.S.C. 154(b) by 304 days.

(21) Appl. No.: 16/220,156

(22) Filed: Dec. 14, 2018

(65) Prior Publication Data

US 2020/0190443 A1 Jun. 18, 2020

(51) Int. Cl.
| | | |
|---|---|---|
| *B29C 39/00* | (2006.01) | |
| *B29C 39/02* | (2006.01) | |
| *B29C 39/38* | (2006.01) | |
| *C11D 13/18* | (2006.01) | |
| *B29B 13/02* | (2006.01) | |
| *C11D 13/30* | (2006.01) | |
| *C11D 13/16* | (2006.01) | |
| *B29C 39/40* | (2006.01) | |

(52) U.S. Cl.
CPC ............ *C11D 13/18* (2013.01); *B29B 13/022* (2013.01); *C11D 13/30* (2013.01); *B29C 39/00* (2013.01); *B29C 39/38* (2013.01); *B29C 39/405* (2013.01); *C11D 13/16* (2013.01)

(58) Field of Classification Search
CPC ......... B29C 39/00; B29C 39/02; B29C 39/38; B29C 39/44; B29C 39/405; C11D 13/16
See application file for complete search history.

(56) References Cited

U.S. PATENT DOCUMENTS

| | | | |
|---|---|---|---|
| 4,030,867 A | | 6/1977 | Everman |
| 4,781,564 A | * | 11/1988 | Cerrone .............. B30B 15/0005 241/273.2 |
| 4,885,108 A | | 12/1989 | Richter |
| 4,917,589 A | * | 4/1990 | Manderson ............ C11D 13/18 264/911 |
| 5,346,656 A | * | 9/1994 | Shafir ................... B29C 67/241 264/330 |
| 5,876,769 A | | 3/1999 | Doeden |
| D411,212 S | | 6/1999 | Jones |
| 6,106,270 A | * | 8/2000 | Hardin .................... B30B 9/305 425/412 |
| 6,902,387 B2 | * | 6/2005 | Cziraky ................. B43K 19/16 249/78 |
| 8,529,239 B1 | | 9/2013 | Black, Jr. |
| 9,193,942 B2 | | 11/2015 | Manning |
| 9,631,166 B1 | * | 4/2017 | Wallace ................. B29C 39/02 |
| 2018/0162015 A1 | * | 6/2018 | Hinton .................... B29C 35/12 |

\* cited by examiner

*Primary Examiner* — Thu Khanh T Nguyen

(57) ABSTRACT

A soap melting assembly includes a chest that is comprised of a microwave safe material thereby facilitating the chest to be heated in a microwave oven. A lid is hingedly coupled to the chest for closing the chest and the lid is comprised of a microwave safe material. A drawer is slidably positioned in the lid and the drawer is comprised of a microwave safe material. A block is stored in the drawer and the block is comprised of glass. The block is removable from the drawer and positioned on the plurality of soap slivers when the chest becomes filled with the soap slivers. Thus, the block compresses the soap slivers into a single bar when the chest and the soap slivers are heated in the microwave oven.

5 Claims, 5 Drawing Sheets

SOAP MELTING ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art including information disclosed under 37 CFR 1.97 and 1.98

The disclosure and prior art relates to melting devices and more particularly pertains to a new melting device for melting slivers of soap into a single bar of soap.

BRIEF SUMMARY OF THE INVENTION

An embodiment of the disclosure meets the needs presented above by generally comprising a chest that is comprised of a microwave safe material thereby facilitating the chest to be heated in a microwave oven. A lid is hingedly coupled to the chest for closing the chest and the lid is comprised of a microwave safe material. A drawer is slidably positioned in the lid and the drawer is comprised of a microwave safe material. A block is stored in the drawer and the block is comprised of glass. The block is removable from the drawer and positioned on the plurality of soap slivers when the chest becomes filled with the soap slivers. Thus, the block compresses the soap slivers into a single bar when the chest and the soap slivers are heated in the microwave oven.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
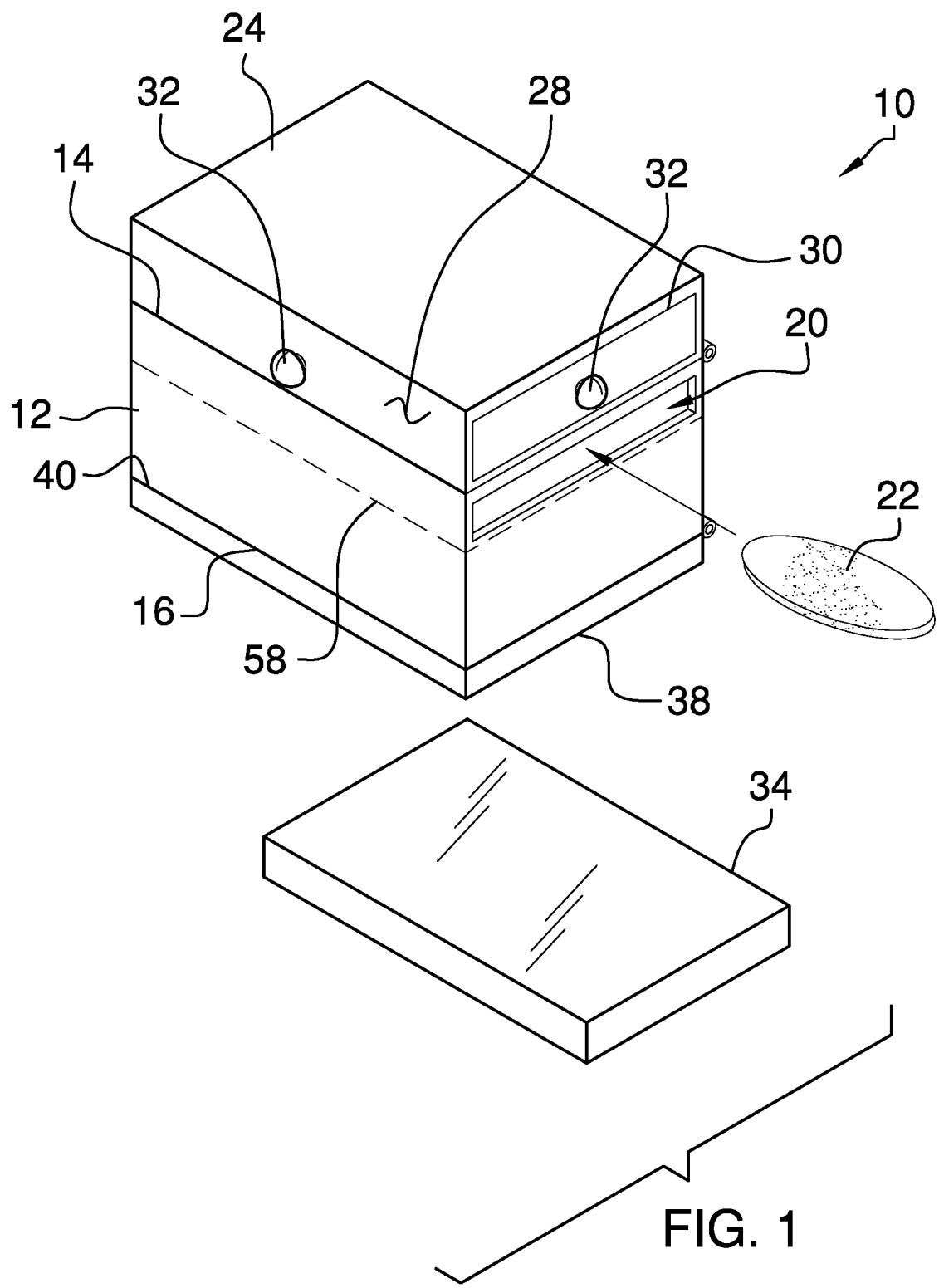
FIG. 1 is a perspective view of a soap melting assembly according to an embodiment of the disclosure.
Figure 2:
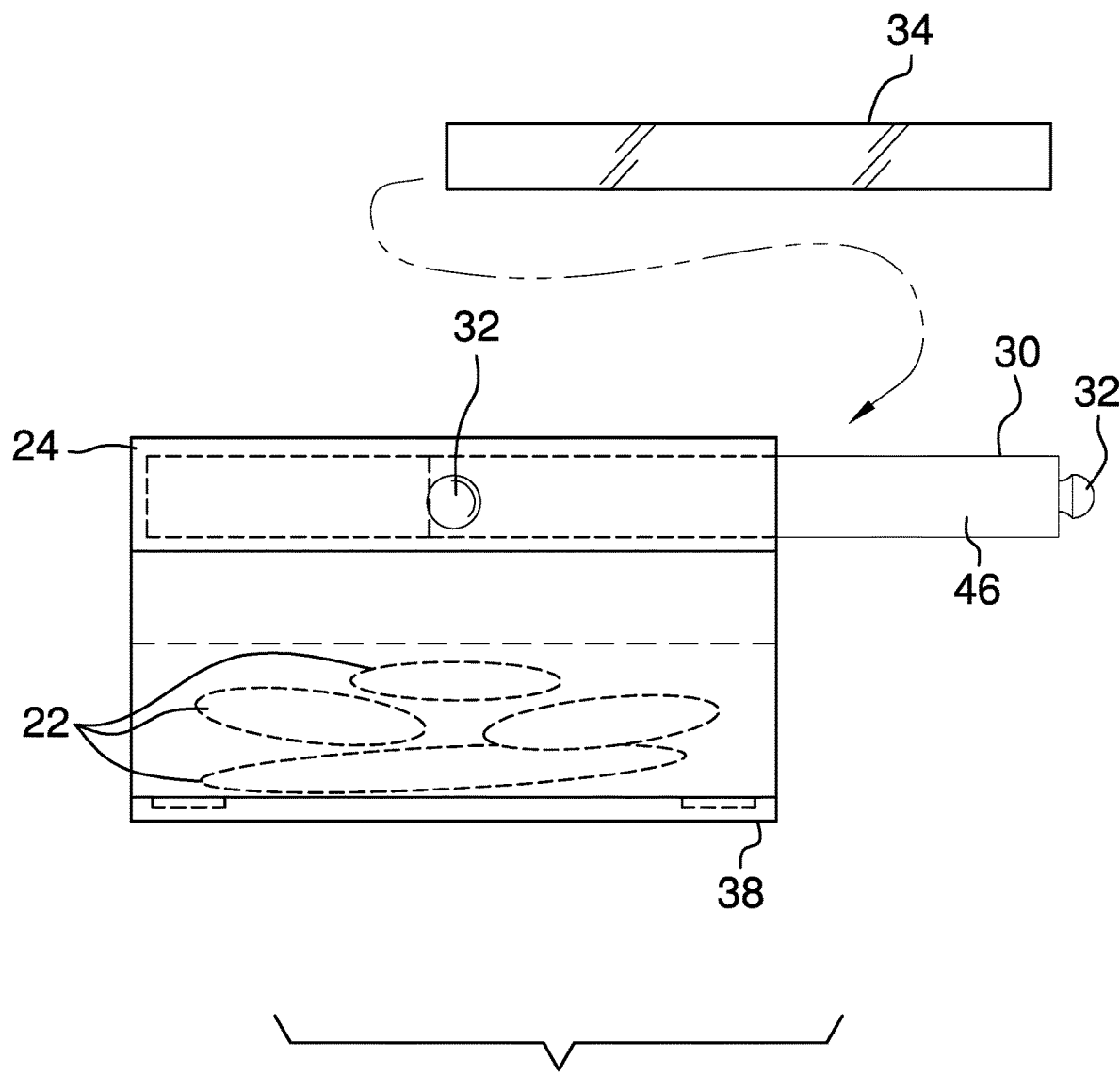
FIG. 2 is a right side phantom view of an embodiment of the disclosure.
Figure 3:
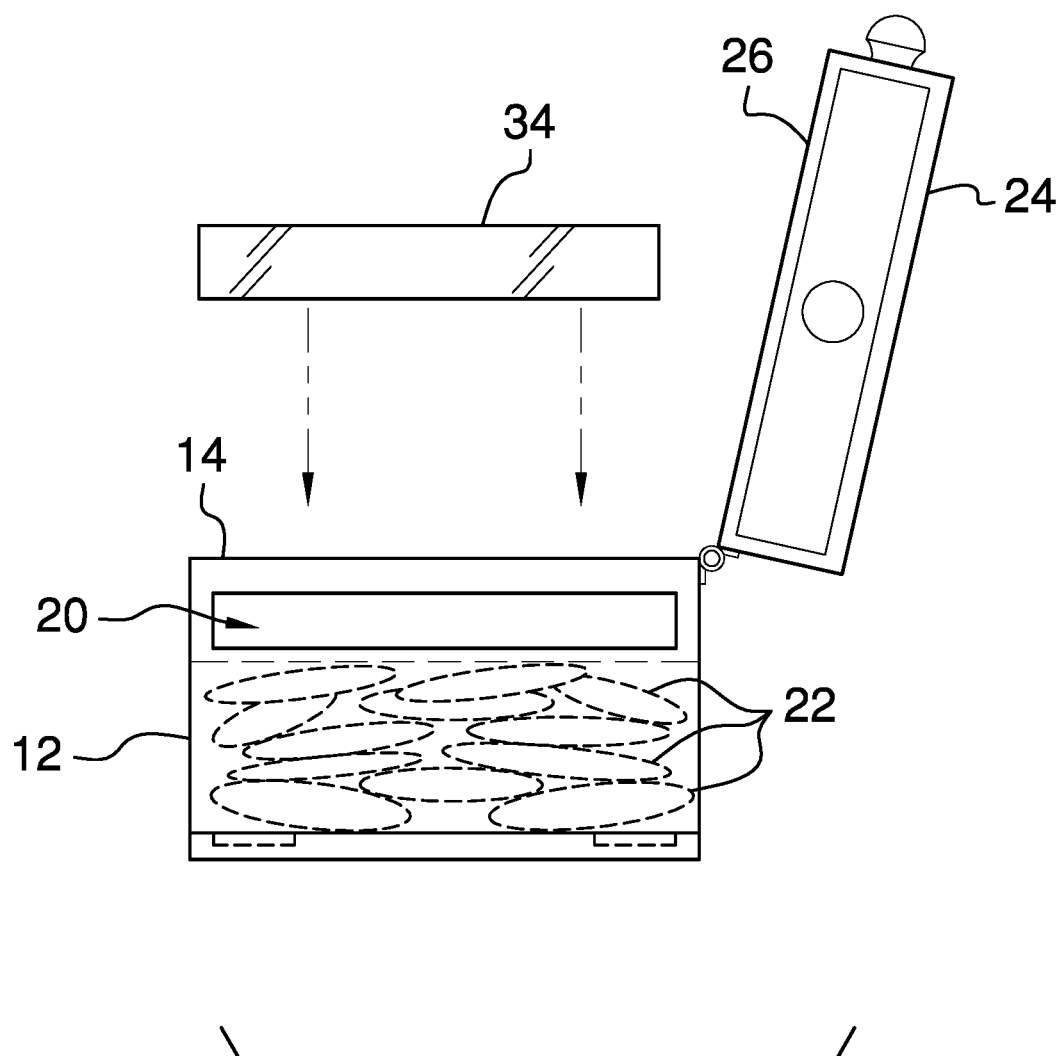
FIG. 3 is a left side phantom view of an embodiment of the disclosure.
Figure 4:
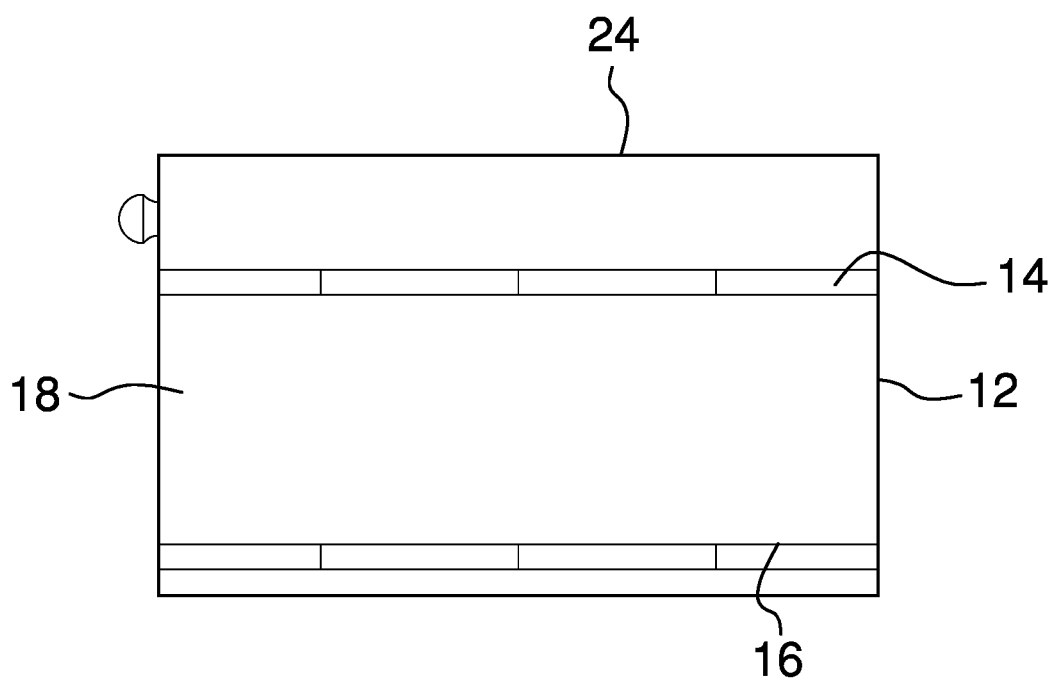
FIG. 4 is a back view of an embodiment of the disclosure.
Figure 5:
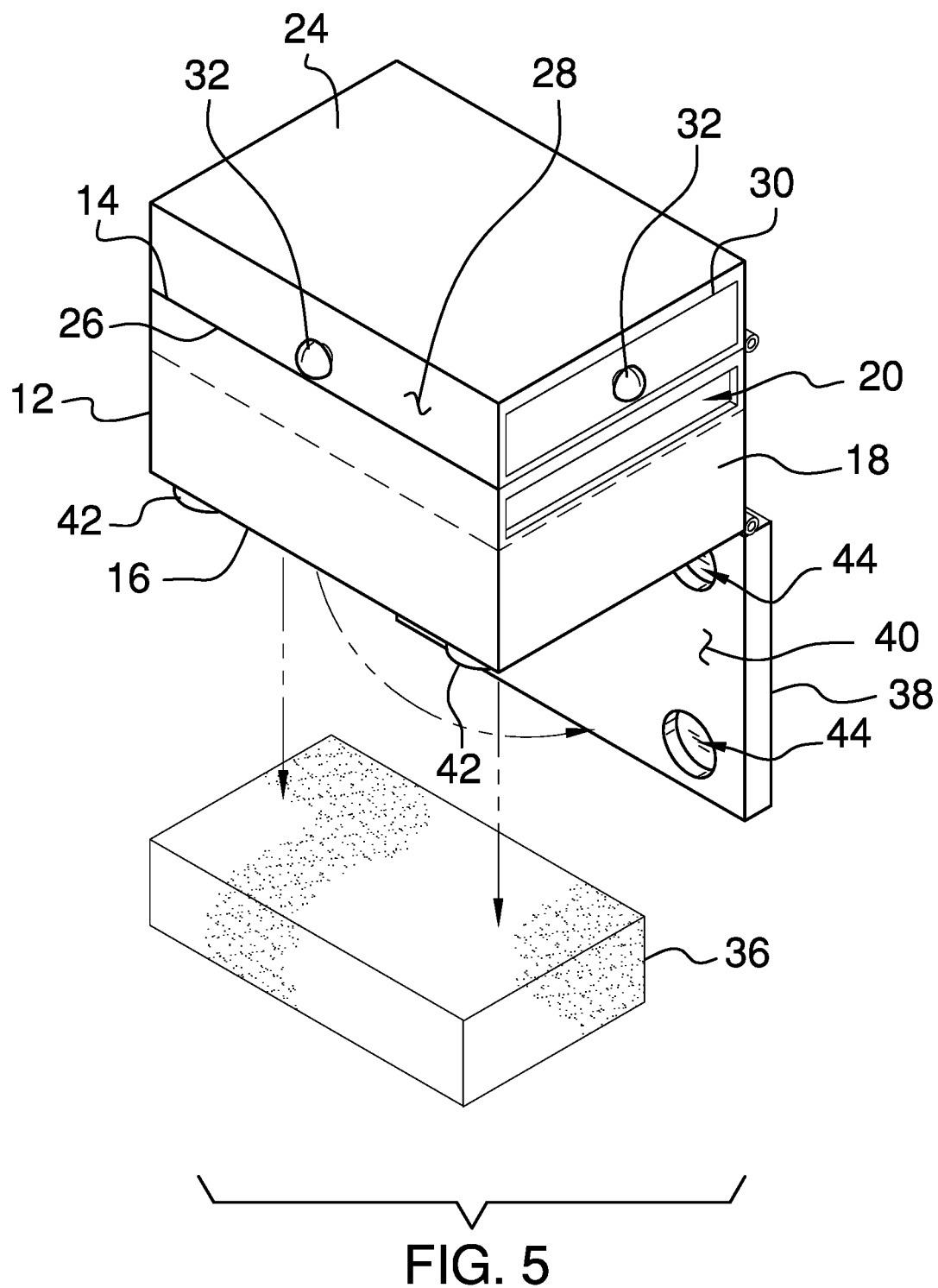
FIG. 5 is a front perspective view of an embodiment of the disclosure showing a single bar of soap being removed from a chest.

With reference now to the drawings, and in particular to FIGS. 1 through 5 thereof, a new melting device embodying the principles and concepts of an embodiment of the disclosure and generally designated by the reference numeral 10 will be described.

As best illustrated in FIGS. 1 through 5, the soap melting assembly 10 generally comprises a chest 12 that is comprised of a microwave safe material thereby facilitating the chest 12 to be heated in a microwave oven. The chest 12 has a top end 14, a bottom end 16 and an outer wall 18 extending therebetween, and each of the top 14 and bottom 16 ends is open. The outer wall 18 has a soap slot 20 extending an interior of the chest 12 for receiving slivers of soap 22. Each of the slivers of soap 22 may be the remains of a bar of bathing soap or the like. Additionally, the chest 12 melts the slivers of soap 22 into a fluid mass when the chest 12 is heated in the microwave oven.

A lid 24 is hingedly coupled to the chest 12 for closing the chest 12 and the lid 24 is comprised of a microwave safe material. The lid 24 has a bottom surface 26 and an outwardly facing surface 28, and the bottom surface 26 covers the top end 14 of the chest 12 when the lid 24 is positioned in a closed position. A drawer 30 is slidably positioned in the lid 24, the drawer 30 is comprised of a microwave safe material and the drawer 30 extends into the outwardly facing surface 28. A pair of knobs 32 is each coupled to a respective one of the lid 24 and the drawer 30 for manipulating the lid 24 and the drawer 30, and each of the knobs 32 is comprised of a microwave safe material.

A block 34 is stored in the drawer 30 and the block 34 is comprised of glass. The block 34 is removable from the drawer 30 and positioned on the slivers of soap when the chest 12 becomes filled with the slivers of soap 22. Thus, the block 34 compresses the slivers of soap 22 into a single bar 36 when the chest 12 and the slivers of soap 22 are heated in the microwave oven. The block 34 has exterior dimensions that are slightly less than the interior dimensions of the chest 12. In this way the block 34 can be easily placed into the chest 12 and removed from the chest 12.

A base 38 is provided and the base 38 is hingedly coupled to the bottom end 16 of the chest 12. The base 38 has a top surface 40 and the top surface 40 covers the bottom end 16 when the base 38 is closed. Moreover, the slivers of soap 22 lie on the top surface 40 when the slivers of soap 22 are positioned in the chest 12. The base 38 is positionable in an open position after the slivers of soap 22 have been melted into the single bar 36 for removing the single bar 36 from the chest 12. A plurality of pegs 42 may each extend downwardly from the bottom end 16 of the chest 12. The top surface 40 of the base 38 may have a plurality of wells 44 each extending downwardly therein. Each of the pegs 42 may be aligned with a respective one of the wells 44 and the pegs 42 may extend into the respective well when the base 38 is closed.

In use, the chest 12 is positioned near a shower or a bathtub and each of the slivers of soap 22 are inserted into the soap slot 20 when the slivers of soap 22 become too small for bathing. The block 34 is removed from the drawer 30 and the block 34 is positioned on top of the slivers of soap 22 once the chest 12 becomes sufficiently filled with the slivers of soap 22. The chest 12 is subsequently placed in a microwave oven for heating and thusly melting the slivers of soap 22. Moreover, the block 34 compresses the melted slivers of soap 22 into a single bar 36 of soap. The base 38 is opened when the single bar 36 of soap has cooled for removing the single bar 36 of soap from the chest 12. In this way the slivers of soap 22 can be continuously recycled into a bar of soap for bathing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A soap melting assembly being configured to receive a plurality of soap slivers and be subsequently placed in an oven for melting the soap slivers into a single bar of soap, said assembly comprising:
   a chest being comprised of a microwave safe material thereby facilitating said chest to be heated in a microwave oven;
   a lid being hingedly coupled to said chest for closing said chest, said lid being comprised of a microwave safe material;
   a drawer being slidably positioned in said lid, said drawer being comprised of a microwave safe material; and
   a block being stored in said drawer, said block being comprised of glass, said block being removable from said drawer and positioned on the plurality of soap slivers when said chest becomes filled with the soap slivers wherein said block is configured to compress the soap slivers into a single bar when said chest and the soap slivers are heated in the microwave oven.

2. The assembly according to claim 1, wherein:
   said chest has a top end, a bottom end and an outer wall extending therebetween, each of said top and bottom ends being open, said outer wall having a soap slot extending an interior of said chest for receiving slivers of soap, said chest melting the slivers of soap when said chest is heated in the microwave oven; and
   said lid has a bottom surface and an outwardly facing surface, said lid being hingedly coupled to said top end of said chest having said bottom surface covering said top end when said lid is positioned in a closed position.

3. The assembly according to claim 2, further comprising a pair of knobs, each of said knobs being coupled to respective one of said lid and said drawer for manipulating said lid and said drawer, each of said knobs being comprised of a microwave safe material.

4. The assembly according to claim 1, further comprising a base being hingedly coupled to said chest, said base having a top surface, said base being hingedly coupled to said bottom end of said chest having said top surface covering said bottom end when said base is closed, the soap slivers lie on said top surface when the soap slivers are positioned in said chest, said base being positionable in an open position after the soap slivers have been melted into the single bar for removing the single bar from said chest.

5. A soap melting assembly being configured to receive a plurality of soap slivers and be subsequently placed in an oven for melting the soap slivers into a single bar of soap, said assembly comprising:
   a chest being comprised of a microwave safe material thereby facilitating said chest to be heated in a microwave oven, said chest having a top end, a bottom end and an outer wall extending therebetween, each of said top and bottom ends being open, said outer wall having a soap slot extending an interior of said chest for receiving slivers of soap, said chest melting the slivers of soap when said chest is heated in the microwave oven;
   a lid being hingedly coupled to said chest for closing said chest, said lid being comprised of a microwave safe material, said lid having a bottom surface and an outwardly facing surface, said lid being hingedly coupled to said top end of said chest having said bottom surface covering said top end when said lid is positioned in a closed position;
   a drawer being slidably positioned in said lid, said drawer being comprised of a microwave safe material, said drawer extending into said outwardly facing surface;
   a pair of knobs, each of said knobs being coupled to respective one of said lid and said drawer for manipulating said lid and said drawer, each of said knobs being comprised of a microwave safe material;
   a block being stored in said drawer, said block being comprised of glass, said block being removable from said drawer and positioned on the plurality of soap slivers when said chest becomes filled with the soap slivers wherein said block is configured to compress the soap slivers into a single bar when said chest and the soap slivers are heated in the microwave oven; and
   a base being hingedly coupled to said chest, said base having a top surface, said base being hingedly coupled to said bottom end of said chest having said top surface covering said bottom end when said base is closed, the soap slivers lie on said top surface when the soap slivers are positioned in said chest, said base being positionable in an open position after the soap slivers have been melted into the single bar for removing the single bar from said chest.

\* \* \* \* \*